United States Patent [19]
Fukushima

[11] Patent Number: 5,367,921
[45] Date of Patent: Nov. 29, 1994

[54] FLYWHEEL ASSEMBLY

[75] Inventor: Hirotaka Fukushima, Neyagawa, Japan

[73] Assignee: Kabushiki Kaisha Daikin Seisakusho, Neyagawa, Japan

[21] Appl. No.: 213,373

[22] Filed: Mar. 15, 1993

Related U.S. Application Data

[63] Continuation of Ser. No. 964,506, Oct. 21, 1992, abandoned.

[30] Foreign Application Priority Data

Oct. 21, 1991 [JP] Japan .................. 3-085624[U]

[51] Int. Cl.$^5$ .................. F16F 15/30; F16D 3/12; F16D 3/80
[52] U.S. Cl. .................. 74/574; 192/70.13; 192/70.17; 192/106.2; 192/DIG. 1; 464/24; 464/68
[58] Field of Search ............... 192/70.13, 70.17, 106.1, 192/106.2, DIG. 1; 74/574; 464/24, 27, 66, 68

[56] References Cited

U.S. PATENT DOCUMENTS

| | | | |
|---|---|---|---|
| 4,777,843 | 10/1988 | Bopp | 74/574 |
| 4,782,936 | 11/1988 | Bopp | 192/106.2 |
| 4,813,524 | 3/1989 | Reik . | |
| 4,828,533 | 5/1989 | Focqueur et al. | 464/24 |
| 4,903,544 | 2/1990 | Naudin et al. | 74/574 |
| 4,905,539 | 3/1990 | Naudin et al. | 74/574 |
| 4,983,142 | 1/1991 | Despres et al. | 464/68 |
| 5,052,978 | 10/1991 | Hanke | 464/24 |
| 5,070,979 | 12/1991 | Ohtsuka et al. | 464/24 X |
| 5,073,143 | 12/1991 | Friedman et al. . | |
| 5,088,964 | 2/1992 | Kuhne | 464/68 |
| 5,119,693 | 6/1992 | Naudin et al. | 74/574 |
| 5,168,775 | 12/1992 | Naudin et al. | 74/574 |
| 5,180,044 | 1/1993 | Fukushima et al. | 192/106.1 |
| 5,194,044 | 3/1993 | Jäckel et al. | 464/24 |
| 5,194,045 | 3/1993 | Hanke | 464/24 |

FOREIGN PATENT DOCUMENTS

| | | | |
|---|---|---|---|
| 2198212 | 6/1988 | United Kingdom | 464/68 |
| 2241560 | 9/1991 | United Kingdom | 464/68 |

Primary Examiner—Richard M. Lorence
Attorney, Agent, or Firm—Knobbe, Martens, Olson & Bear

[57] ABSTRACT

A flywheel assembly comprises a first flywheel connectable to an engine crankshaft, a second flywheel on which a clutch mountable, rotatably supported by the first flywheel, and a replaceable inter-flywheel drive-driven plates/damper unit. The unit is composed of a drive plate sandwich detachably connected to the first flywheel, a composite driven plate disengageably engaged with the second flywheel, and a viscous damper. The viscous damper connects the drive and driven plates, and the compound damper/drive-driven plates unit is replaceable as a whole.

15 Claims, 6 Drawing Sheets

FLYWHEEL ASSEMBLY

This is a file-wrapper continuation application of U.S. patent application Ser. No. 07/964,506, filed Oct. 21, 1992, and entitled "FLYWHEEL ASSEMBLY", now abandoned.

BACKGROUND OF THE INVENTION

The present invention relates to a flywheel assembly, and particularly to a flywheel assembly comprising a first flywheel, a second flywheel, and a viscous damping mechanism located between the flywheels.

Compound flywheel assemblies for automobile engines are in current use. Such a flywheel assembly typically comprises first and second flywheels, with a viscous damping mechanism disposed between them, as disclosed in U.S. Pat. No. 4,739,866 for example.

Figure 6:
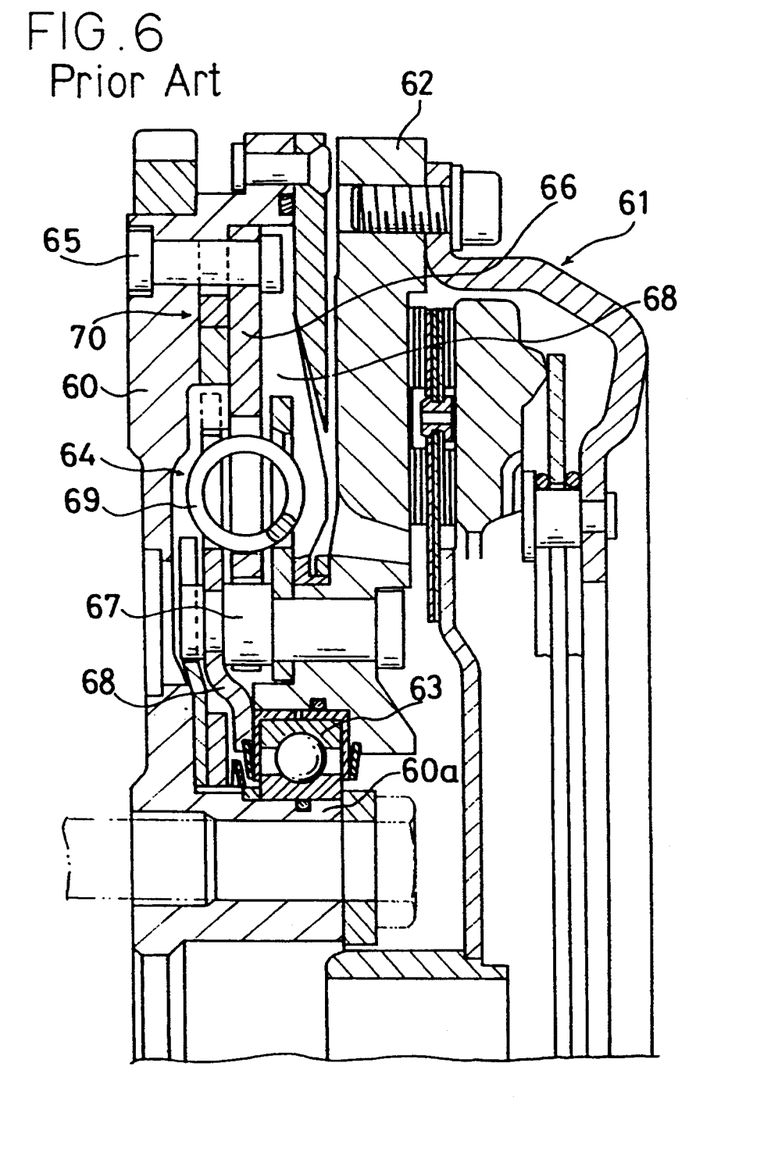
FIG. 6 is a sectional, partial view of a flywheel assembly in prior art.

FIG. 6 shows a flywheel assembly as described in the above-cited United States patent. This assembly comprises a first flywheel 60 which is connected to an engine crankshaft and a second flywheel 62 on which a clutch 61 is mounted. The second flywheel 62 is rotatably supported on a hub 60a formed in the center of the first flywheel 60 through a bearing 63. A viscous damping mechanism 64 is disposed between the first and second flywheels 60 and 62 and elastically interconnects them. The viscous damping mechanism 64 is composed of a drive plate 66, a driven plate 68 connected to the second flywheel 62 by rivets 67, and torsion springs 69 for elastically connecting the drive plate 66 and the driven plate 68. A viscous damper 70 is located between the drive plate 66 and the first flywheel 60.

Torque transmitted to the first flywheel 60 is transmitted then from the drive plate 66 to the driven plate 68 through the viscous damper 70 and the torsion springs 69. The torque is in turn transmitted from the second flywheel 62 to a transmission-side member through the clutch 61.

The viscous damper 70 is subject to gradual wear over prolonged use of the flywheel assembly. Since the life or vehicles such as trucks or buses employing this viscous damper is longer than that of the damper itself, the damper must be replaced or rebuilt in maintenance.

However, the drive plate 66, which contains the viscous damper, is fixed to the first flywheel 60 through rivets 65, which encumbers the performance of maintenance to the flywheel assembly. It is necessary, for example, to provide special equipment for reassembly, increasing maintenance costs.

Reassembly of the viscous damper mechanism 64 changes its axial clearances such that it is difficult to obtain consistency of the restored damping characteristics.

Wherein it is desirable to alter the damping characteristics to better suit the operating conditions or particular characteristics of vehicles into which the flywheel assembly is installed, it would become necessary to disassemble all related components and change the viscous damper or the torsion springs. However, such disassembly work is so troublesome that the whole flywheel assembly is simply replaced in order to change the damping characteristics.

SUMMARY OF THE INVENTION

It is an object of the present invention to facilitate and reduce the cost of reassembling a flywheel/damper assembly in maintenance, and to enable the ready alteration of its damping characteristics to suit operating conditions.

A flywheel assembly according to an aspect of the present invention comprises a first flywheel connectable to an input member, a second flywheel connectable to an output member, and a damping unit. The second flywheel is rotatably supported by the first flywheel. The damping unit is disposed between the flywheels, and includes a drive member detachably connected to the first flywheel, a driven member detachably connected to the second flywheel, and a viscous damper connecting the drive member and the driven member.

Input power is transmitted from the first flywheel to the second flywheel through the damping unit, then to the output member. Torque fluctuations generated on the engine side are damped between the first and second flywheels by the damping unit.

The drive and the driven members are detachable from the first and second flywheels. Consequently, the entire damping unit can be easily removed from the first and second flywheels, whereby disassembly and reassembly in maintenance are facilitated. Furthermore, since the damping unit is easily replaced as a unit, damping characteristics optimally corresponding to the use conditions or particular requirements of vehicles to which the flywheel/damper assembly is mounted are easily obtained.

The foregoing and other objects and advantages of the present invention will become more apparent from the following detailed description, with reference to the accompanying drawings.

DESCRIPTION OF THE PREFERRED EMBODIMENTS

Figure 1:
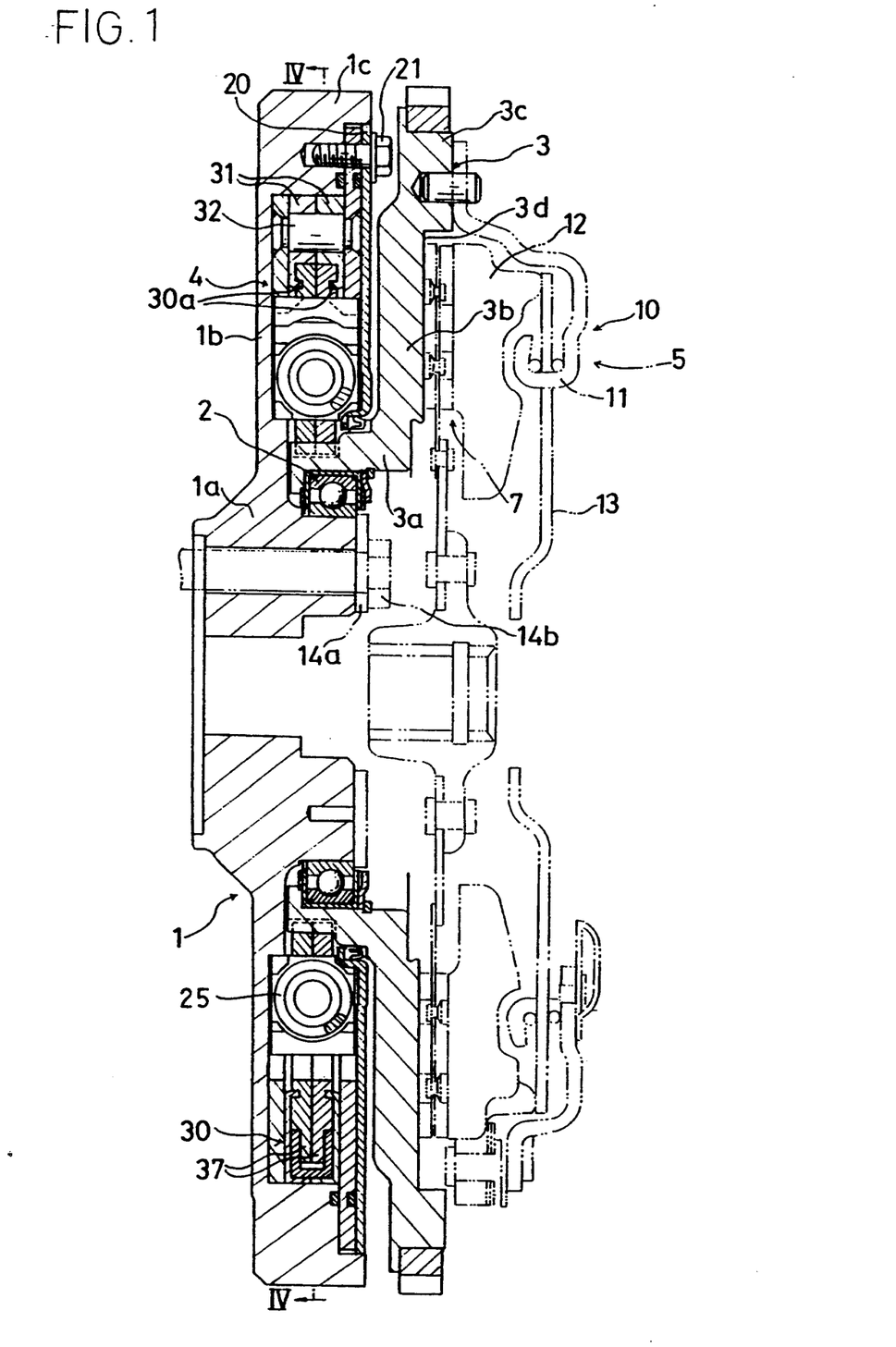
FIG. 1 is a sectional view of a flywheel assembly according to a preferred embodiment of the invention.

FIG. 1 shows a flywheel assembly in an embodiment according to the present invention.

This flywheel assembly comprises a first flywheel 1, a second flywheel 3 rotatably supported by the first flywheel through a bearing 2, and a damping unit 4 disposed between the first flywheel 1 and the second flywheel 3. The first flywheel 1 is fixed to the crankshaft (not shown) of a motor vehicle engine. A clutch 5 is mountable on the second flywheel 3.

Figure 2:
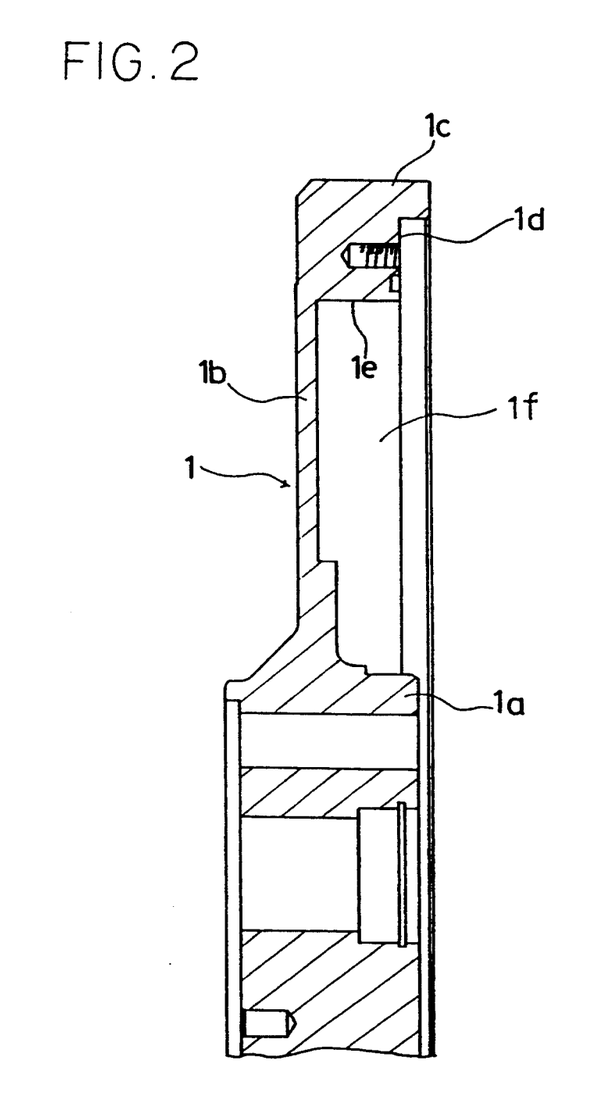
FIG. 2 is a sectional, partial view of a first flywheel.

The first flywheel 1, as is apparent from FIGS. 1 and 2, is a composite disc formed by a central hub 1a bolted to the crankshaft, a collar portion 1b integral with the hub 1a and extending radially outward, and a flywheel portion 1c integrally formed as a rim around the periphery of the collar portion 1b axially protruding toward the second flywheel 3. The hub 1a extends into the second flywheel 3 and rotatably supports it through the bearing 2 disposed thereon. The damping unit 4 (described later) is contained in an annular space if defined between the hub 1a and the flywheel portion 1c. The bearing 2 is retained by a plate 14a attached to the crown of the hub 1a through screws 14b.

Figure 3:
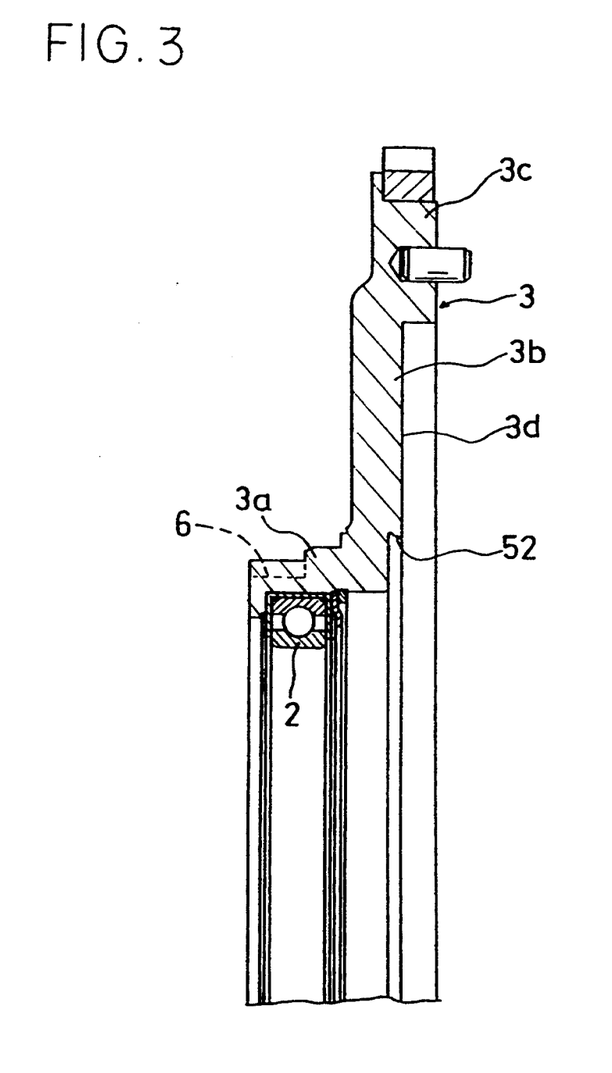
FIG. 3 is a sectional, partial view of a second flywheel.
Figure 4:
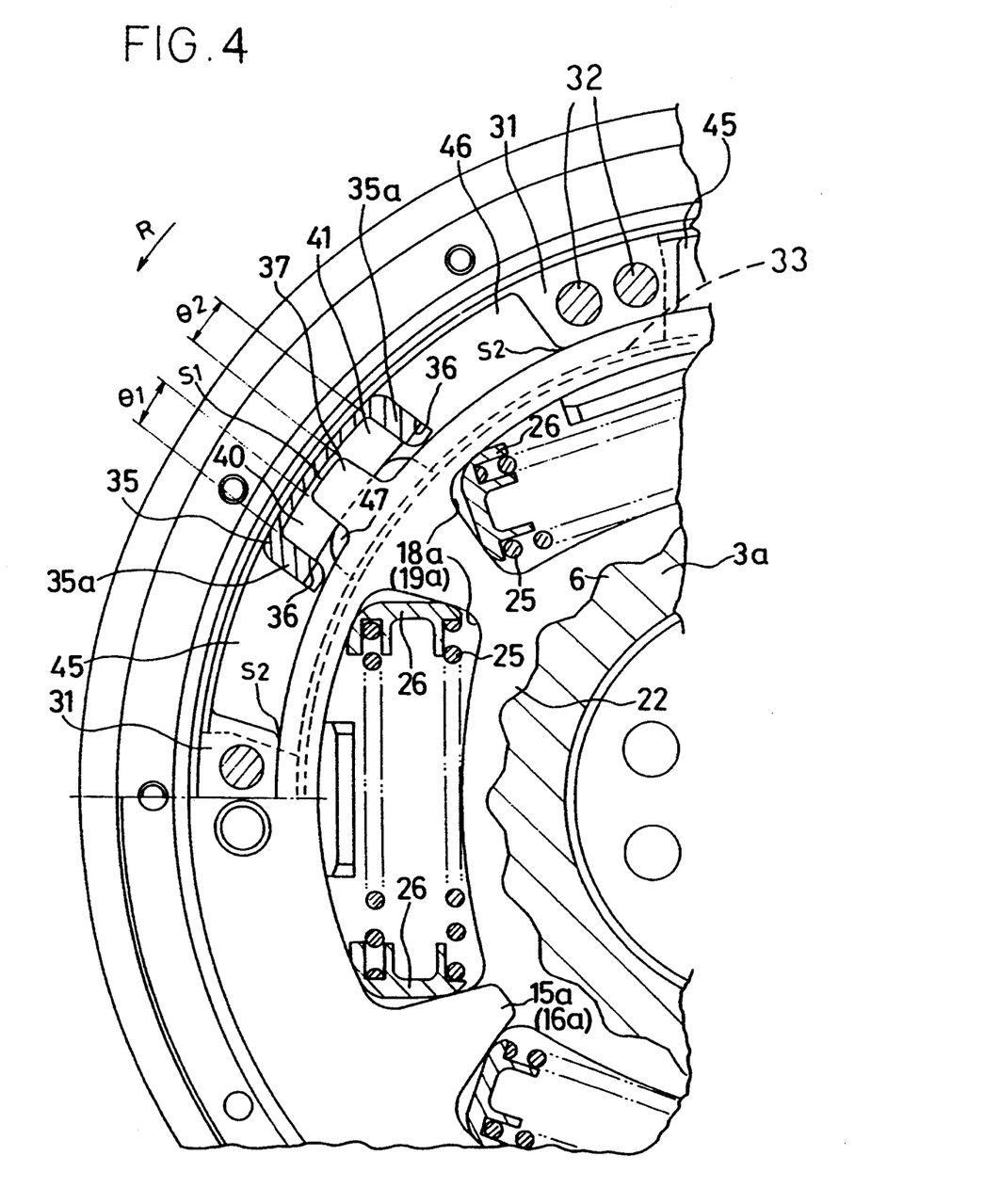
FIG. 4 is a partially cut away sectional view taken through line IV—IV of FIG. 1.

The second flywheel 3, as is apparent from FIGS. 1 and 3, is a composite disc formed by a central hub 3a, a pressured portion 3b integral with the hub 3a and extending radially, and a clutch mounting portion 3c integral with the circumferential periphery of the pressured portion 3b. The hub 3a extends toward the first flywheel 1 and its inner surface is supported on the bearing 2. Formed adjacent the crown of the hub 3a are, as shown in FIG. 4, wave-like teeth 6 with which an output portion of the damping unit 4 is engaged. The surface of the pressured portion 3b on the clutch-ward side is a friction facing 3d onto which the friction material of a clutch disc 7 presses. The friction facing 3d extends axially beyond the adjacent end face of the hub 3a, wherein the radially inner surface of this extension forms a receiving portion 52 circumferentially recessed. This receiving portion 52 captures grease escaping radially outward along the clutch disc 7-side surface of the second flywheel 3 under centrifugal force during operation.

A clutch cover assembly 10 comprising the clutch 5 is mounted onto a corresponding facing of the clutch mounting portion 3c. The clutch cover assembly 10 is composed of a clutch cover 11, a pressure plate 12 and a diaphragm spring 13.

Figure 5:
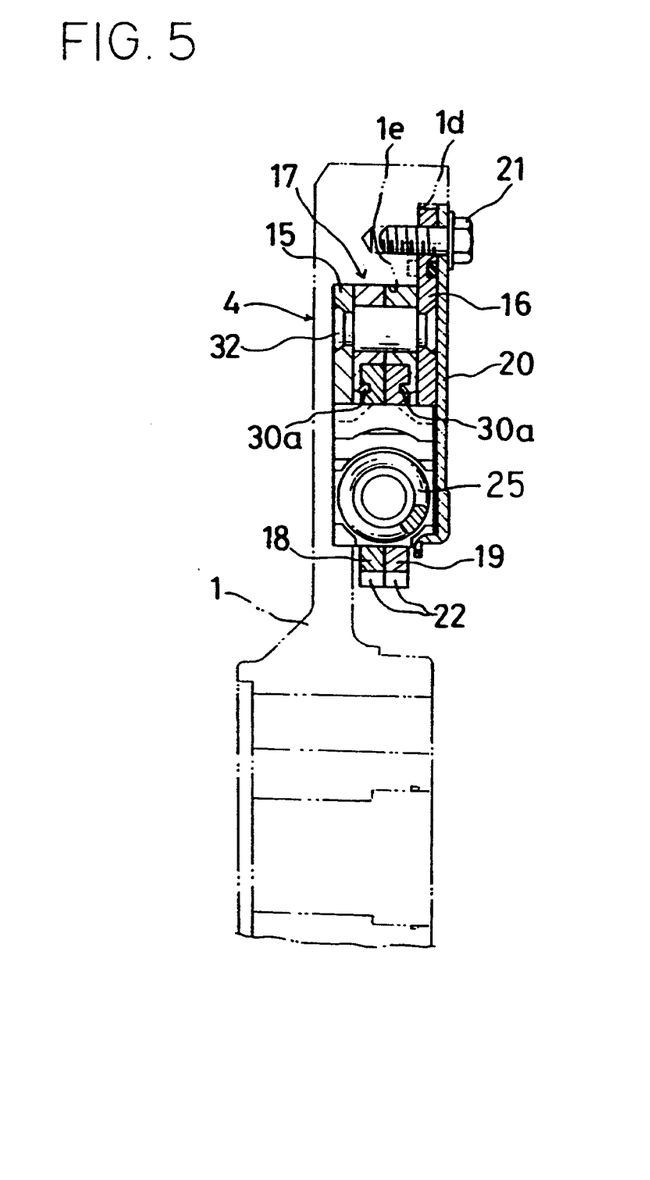
FIG. 5 is a sectional view of a damping unit.

Next, the damping unit 4 will be explained with reference to FIGS. 1, 4 and 5.

The damping unit 4 includes a pair of drive plates 15 and 16, a viscous damper 17 disposed between the drive plates 15 and 16, and a pair of driven plates 18 and 19 elastically connected to the pair of the drive plates 15 and 16 through the viscous damper 17. The outside diameter of the drive plate 16, which is located on the second flywheel 3-side, is larger than that of the drive plate 15, wherein the drive plate 16 is installed into a recess 1d, of corresponding diameter, formed in the flywheel portion 1c of the first flywheel. The drive plate 15 and the viscous damper 17 are installed into a second recess defined by the collar portion 1b and the inner diametrical surface of the flywheel portion 1c, and formed radially inward of the first recessed portion 1d. The damping unit 4 is installed into the space 1f of the first flywheel 1 and is retained by a seal plate 20 and bolts 21. A sealing member is interposed between the radially inward margin of the seal plate 20 and the adjacent periphery of the hub 3a of the second flywheel 3. The driven plates 18 and 19 have, as shown in FIG. 4, complementary wave-like teeth 22 which engage with the wave-like teeth 6 formed adjacent the crown of the hub 3a of the second flywheel 3. This engagement makes it possible for the driven plates 18, 19 and the second flywheel 3 to rotate integrally.

The drive plates 15 and 16 are rings having, as shown in FIG. 4, circumferentially equidistant projections 15a and 16a projecting radially inward. The driven plates 18 and 19 have a plurality of apertures 18a and 19a in corresponding circumferential spacing. Coil springs 25 are so arranged in the apertures 18a and 19a as to be circumferentially compressible. The coil springs 25 abut against the circumferentially opposing walls of the apertures 18a and 19a, as well as the adjacent projections 15a and 16a, through spring seats 26. When the damping unit 4 is not activated, only the radially inward ends of the spring seats 26 abut against the circumferentially opposing walls of the apertures 18a and 19a and the projections 15a and 16a. That is, the ends of the coil springs 25 contained in the apertures 18a and 19a are situated on a bias with respect to the projections 15a and 16a, and the coincident walls of the apertures 18a and 19a.

An annular fluid housing 30 is disposed around the periphery of the driven plates 18 and 19. The fluid housing 30 has a plurality of tabs 31 circumferentially spaced apart from one another at fixed intervals. The tabs 31 project radially inward. In addition, each tab 31 has holes through which pins 32 penetrate. The pins 32 tighten the fluid housing 30 between the drive plates 15 and 16. The length of the body of the pins 32 determines the axial dimension of the fluid housing 30, which in turn relates to viscous damping characteristics. Along the radially inward portion or the fluid housing 30 are an opposed pair of interior rims 30a, which fit into annular grooves 33 formed in the driven plates 18, 19 in order to seal a fluid chamber defined by the fluid housing 30. Thus, the walls of the fluid housing 30 peripherally enclose the fluid chamber.

A slider 35, slidable in the circumferential direction, disposed within the fluid housing 30. The slider 35 is formed as a cap which opens radially inward, and its radially outer wall arced to conform to the inner surface of the adjacent peripheral wall of the fluid housing 30. Fluid passages 36 are formed in the circumferential ends of the slider 35 at their radially inward portions.

Projections 37, projecting radially outward, are formed on the composite periphery of the driven plates 18 and 19. Each projection 37 projects into a corresponding slider 35. The circumferentially opposing walls of each slider 35 form stop portions 35a which are circumferentially spaced apart from the projection 37 by, for example, angles of $\theta 1$ and $\theta 2$, respectively, when the engine is at rest. The projection 37 divides the space interior of the slider 35 into a first subcompartment 40 in its forward portion and a second subcompartment 41 in its rear portion with respect to the direction of rotation R, and forms a subchoke S1, whereby the subcompartments 40 and 41 communicate along the inner surface of the slider 35.

Main chokes S2, by which adjacent compartments 45 and 46 of the fluid chamber communicate, are formed between the concave inner surface of the tabs 31 and the peripheral composite edge of the driven plates 18 and 19. The clearance of the main chokes 82 is smaller than that of the subchokes S1. In other words, the flow-sectional area of a subchoke S1 is greater than that of a main choke S2. The fluid housing 30 has fluid compensation openings 47 formed midway between adjacent tabs 31.

Description will now be made of the operation of the flywheel assembly.

When torsional torque is generated during operation, the first flywheel 1 and the drive plates 15 and 16 are twisted clockwise or counterclockwise relative to the driven plates 18 and 19. Initially, under small-angle torsion, the coil springs 25 are compressed until their partially contacting ends just meet the adjacent walls of the apertures 18a and 19a, through which stage the viscous damper 17 provides low-torsion rigidity. As the angle of torsion increases, the coil springs 25 are compressed with their ends fully abutting the corresponding end faces of the apertures 18a and 19a, after which stage the viscous damper 17 provides high-torsion rigidity.

The following is a description of the generation of hysteresis torque due to the flow of fluid in the viscous damper 17 caused by changes in torsional torque.

Given the state wherein the projection 37 is not abutting against either of the stop portions 35a of the slider 35, and that the drive plates 15 and 16 rotate in, for example, the direction R relative to the driven plates 18 and 19, then the housing 30 and the slider 35 move in union in the direction R. Consequently, the second subcompartment 41 is compressed, whereby its volume decreases, and at the same time the first subcompartment 40 is enlarged, whereby its volume increases. As a result, the fluid flows mainly from the second subcompartment 41 into the first subcompartment 40 through the subchoke S1. In this instance, since the flow-sectional area of subchoke S1 is large, the resistance of the passage is small. Consequently, the hysteresis torque generated is low.

When the angle of torsion becomes so great that the stop portion 35a of the trailing-end wall of the slider 35 with respect to the direction R contacts the projection 37, the subchoke S1 is closed off and the slider 35 is pressed against the projection 37, i.e., the slider 35 moves in conjunction with the projection 37. The drive plates 15 and 16 and the housing 30 move forward in the direction R relative to the driven plates 18 and 19 and the slider 35. Consequently, fluid in each compartment 46 flows reverse to the direction R into that compartment 45 succeeding it through the main choke S2, and also flows forward in the direction R into each compartment 45 preceding it through a gap between the arced outer surface of the slider 35 and the housing 30. In this instance, since the flow-sectional area of the main choke S2 is small, high fluid resistance thereby obtains. Consequently, the hysteresis torque generated is high.

Next, a maintenance operation will be explained.

In order to change the damping unit 4, the clutch 5 is detached from the flywheel assembly. Then, the bolts 14b and the plate 14a are removed. The second flywheel 3 together with the bearing 2 are removed from the first flywheel 1. By removing the bolts 21, the seal plate 20 and the damping unit 4 are detached. Another, new damping unit 4 may then be installed into the first flywheel 1 in reverse order to removal, after which the second flywheel 3 and the clutch 5 are remounted.

As explained, the damping unit 4 can be easily removed by unfastening the bolts 21, enabling the maintenance to be carried out quickly with ease.

Suiting the viscous damper to a wide variety of applications is facilitated by the fact that the damping unit 4 is self-contained, and therefore can be changed depending upon operating conditions and to correspond to vehicular characteristics.

Expendable components such as the drive plates and driven plates are built into the damping unit 4 such that the first and second flywheels do not have to be replaced when time damping unit 4 is changed, thereby decreasing maintenance costs.

Damping characteristics are thus effectively restored through the changing operation. The length of the stop pins 32 determines time axial dimension of the fluid housing 30, which in turn accordingly affects the damping characteristics of the damping unit 4.

Various details of the invention may be changed without departing from its spirit nor its scope. Furthermore, the foregoing description of time embodiments according to the present invention is provided for the purpose of illustration only, and not for time purpose of limiting the invention as defined by the appended claims and their equivalents.

What is claimed is:

1. A flywheel assembly comprising:
   a first flywheel connectable to an input member;
   a second flywheel connectable to an output member, supported rotatably on said first flywheel;
   a unitary, removable damping unit located between said first and second flywheels; and
   a connection member for solely and detachably connecting said damping unit to said first flywheel, said connection member being capable of repeated use for said detachable connection,
   said damping unit comprising:
      a pair of ring-shaped drive plates, one of which being detachably connected to said first flywheel through said connection member;
      a ring-shaped driven plate interposed between said pair of drive plates, and being detachably connected to said second flywheel;
      a viscous damping fluid interjoining said drive plates and said driven plate; and
      a plurality of pins for connecting said pair of drive plates at a given spacing therebetween, whereby said drive plates, said driven plate and said viscous damping fluid are assembled as an integral unit;
   whereby said damping unit may be easily selectively removed and integrally replaced with another damping unit having the same or modified damping characteristics.

2. A flywheel assembly according to claim 1, wherein said first flywheel includes a central first hub extending toward said second flywheel, and an axially protruding rim defining a housing space between itself and said first hub for retaining said damping unit.

3. A flywheel assembly according to claim 2, wherein said second flywheel includes a central second hub extending toward said first flywheel and enclosing said first hub;
   said flywheel assembly further comprising a bearing disposed between said first and second hubs.

4. A flywheel assembly according to claim 3, further comprising bolts and a plate, for retaining said bearing to said first flywheel.

5. A flywheel assembly according to claim 3, wherein:
   one of said pair of drive plates detachably connected to said first flywheel through said connection member has a radially outward portion protruding therefrom, said drive plates having an inner diameter greater than an outer diameter of said first hub, and
   said driven plate includes a radially interior portion peripherally connectable to said second hub of said second flywheel.

6. A flywheel assembly according to claim 1, wherein said connection member is a bolt, a screw or other mechanical element which is repeatedly used in connecting and disconnecting the damping unit to said first flywheel.

7. A flywheel assembly according to claim 5, wherein formed peripherally on said second hub and formed interiorly of said driven plate are engagement portions which engage mutually such that said second flywheel and said driven plate are integrally rotatable, and are separable in the axial direction.

8. A flywheel assembly according to claim 6, wherein said damping unit includes a fluid housing having a pair of fluid chambers, of which volumes are changed by a twisting of either said drive member or said driven member relative to the other, and a first choke by which said fluid chambers communicate; and said pins penetrate said fluid housing and determine an axial dimension thereof.

9. A flywheel assembly according to claim 8, wherein said fluid housing opens radially inward, and said driven plate has a plurality of choke projections provided along its circumferential periphery and projecting into said fluid housing;

said flywheel assembly further comprising a plurality of choke tabs formed in and integral with said fluid housing, each of which is penetrated by at least one of said pins, and a slider slidably located in said fluid housing between adjacent of said choke tabs, covering each of said choke projections.

10. A flywheel assembly according to claim 9, wherein a first choke defined between each of said choke tabs and said fluid housing has a flow sectional area smaller than that of a second choke defined between each of said choke projections and a corresponding said slider.

11. A flywheel assembly according to claim 1, said damping unit further includes an elastic connection mechanism for elastically connecting said drive plates and said driven plate in the circumferential direction.

12. A flywheel assembly according to claim 11, wherein said elastic connection mechanism includes an aperture extending circumferentially in said driven plate, an elastic member disposed in said aperture, and projections extending from said drive plate for endwise retention of said elastic member.

13. A flywheel assembly according to claim 12, wherein said elastic member is a coil spring, of which ends abut on circumferentially opposed walls of said aperture at a bias wherein said first and second flywheels are not twisted relative to each other.

14. A flywheel assembly according to claim 1, wherein one of said pair of drive plates detachably connected to said first flywheel through said connection member has a radially outward portion protruding therefrom;

a plurality of pins connecting said pair of drive plates so as to provide a given spacing therebetween;

said driven plate includes a radially interior portion connectable peripherally to a hub of said second flywheel;

said viscous damping means includes an annular fluid housing having a pair of fluid chambers, of which volumes are changed by a twisting of either said drive plate or said driven plate relative to the other, and a first choke by which said fluid chambers communicate; and said pins penetrate said fluid housing and determine an axial dimension thereof.

15. A flywheel assembly according to claim 1, further comprising a clutch mounted on said second flywheel.

* * * * *